(12) United States Patent
Shi et al.

(10) Patent No.: US 12,304,098 B2
(45) Date of Patent: May 20, 2025

(54) CUTTING DEVICE, CUTTING METHOD, AND CUTTING APPARATUS

(71) Applicant: Contemporary Amperex Technology (Hong Kong) Limited, Hong Kong (CN)

(72) Inventors: Yunru Shi, Ningde (CN); Zhihua Wen, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/911,266

(22) Filed: Oct. 10, 2024

(65) Prior Publication Data
US 2025/0033234 A1   Jan. 30, 2025

Related U.S. Application Data

(63) Continuation of application No. PCT/CN2023/082569, filed on Mar. 20, 2023.

(30) Foreign Application Priority Data

Apr. 12, 2022  (CN) .......................... 202210380774.6

(51) Int. Cl.
    *B26D 1/06*        (2006.01)
(52) U.S. Cl.
    CPC .................................... *B26D 1/065* (2013.01)
(58) Field of Classification Search
    CPC ............. Y10T 83/0524; Y10T 83/8876; Y10T 83/8878; Y10T 83/8821; Y10T 83/9444;
    (Continued)

(56) References Cited

U.S. PATENT DOCUMENTS 3,765,293 A * 10/1973 Fries ...................... B23D 33/00
                                                                  83/543
3,968,714 A *  7/1976 Kuchyt ................ B23D 35/005
                                                                 83/639.7
(Continued)

FOREIGN PATENT DOCUMENTS

CN        207952750 U       10/2018
CN        110227852 A        9/2019
(Continued)

OTHER PUBLICATIONS

International Search Report received in the counterpart international application PCT/CN2023/082569, mailed on Jun. 29, 2023.
(Continued)

*Primary Examiner* — Phong H Nguyen
(74) *Attorney, Agent, or Firm* — K&L Gates LLP

(57) ABSTRACT

Provided are a cutting device, a cutting method, and a cutting apparatus. The cutting device includes a base; a pair of cutting blades, mounted to the base; a drive mechanism, configured to drive the pair of cutting blades to close or open to each other in a first direction; and an adjusting mechanism, configured to drive at least a portion of the base to undergo elastic deformation in a second direction before or during an opening process of the pair of cutting blades driven by the drive mechanism, so as to form a clearance between the pair of cutting blades in the second direction, wherein the second direction is a movement direction of a cutting material and intersects with the first direction.

20 Claims, 6 Drawing Sheets

(58) Field of Classification Search
CPC ...... Y10T 83/9447; B26D 1/065; B26D 1/01;
B26D 1/015; B26D 1/02; B26D 1/025;
B26D 1/03; B26D 1/035; B26D 1/04;
B26D 1/045; B26D 1/06; B26D 1/08;
B26D 1/085; B26D 1/09; B26D 1/095;
B26D 2210/11; B23D 15/00; B23D
15/005; B23D 15/04; B23D 15/06; B23D
15/08

See application file for complete search history.

(56) References Cited

U.S. PATENT DOCUMENTS

| | | | | |
|---|---|---|---|---|
| 4,131,223 A | * | 12/1978 | Aureli | A44B 19/58 |
| | | | | 83/921 |
| 5,237,901 A | * | 8/1993 | Warga, III | B23D 35/002 |
| | | | | 83/636 |
| 2013/0104718 A1 | * | 5/2013 | Tai | B26D 7/2628 |
| | | | | 83/582 |
| 2016/0214266 A1 | * | 7/2016 | Ikeuchi | B21D 35/007 |

FOREIGN PATENT DOCUMENTS

| | | |
|---|---|---|
| CN | 209986063 U | 1/2020 |
| CN | 212793911 U | 3/2021 |
| CN | 214443491 U | 10/2021 |
| DE | 102005003204 B3 | 6/2006 |
| DE | 102010019325 A1 | 11/2011 |

OTHER PUBLICATIONS

Written Opinion of ISA received in the counterpart international application PCT/CN2023/082569, mailed on Jun. 29, 2023.

The Request for the Submission of an Opinion received in the counterpart Korean Application 10-2024-7024728, mailed on Nov. 19, 2024.

* cited by examiner

CUTTING DEVICE, CUTTING METHOD, AND CUTTING APPARATUS

CROSS-REFERENCE TO RELATED APPLICATION

The present disclosure is a continuation of International Application No. PCT/CN2023/082569, filed on Mar. 20, 2023, which claims the priority to the Chinese patent application with the filling No. 202210380774.6 filed on Apr. 12, 2022, and entitled "CUTTING DEVICE, CUTTING METHOD, AND CUTTING APPARATUS", the contents of which are incorporated herein by reference in entirety.

TECHNICAL FIELD

The present disclosure relates to the technical field of batteries, and in particular to a cutting device, a cutting method, and a cutting apparatus.

BACKGROUND ART

Energy conservation and emission reduction are the keys to the sustainable development of the automotive industry. Electric vehicles, due to their advantages of being energy-saving and environmentally friendly, have become an important component of sustainable development in the automotive industry. For electric vehicles, battery technology is a crucial factor that affects their development.

In the manufacturing process of the battery, it is necessary to use the cutting device to cut the electrode sheet. However, during the cutting process, there will be the risk of the cutting blade scraping the material strip, thus leading to poor quality of the electrode sheet after cutting.

SUMMARY

The present disclosure provides a cutting device, a cutting method, and a cutting apparatus, which can reduce the risk of the cutting blade scraping the material strip, thus improving the cutting quality of the material strip.

The present disclosure is realized by the following technical solutions.

In a first aspect, the present disclosure provides a cutting device, comprising a base; a pair of cutting blades, mounted to the base; a drive mechanism, configured to drive the pair of cutting blades to close or open to each other in a first direction; and an adjusting mechanism, configured to drive at least a portion of the base to undergo elastic deformation in a second direction before or during an opening process of the pair of cutting blades driven by the drive mechanism, so as to form a clearance between the pair of cutting blades in the second direction, wherein the second direction is a movement direction of a cutting material and intersects with the first direction.

According to the cutting device of the embodiments of the present disclosure, the adjusting mechanism drives the base to undergo elastic deformation in a second direction before or during an opening process of the pair of cutting blades driven by the drive mechanism, so as to form a clearance between the pair of cutting blades in the second direction. This reduces the risk of the pair of cutting blades contacting the material strip during the process of opening, thereby decreasing the probability of the pair of cutting blades scraping the material strip and improving the cutting quality of the material strip.

According to some embodiments of the present disclosure, the second direction is perpendicular to the first direction.

In the above embodiment, the second direction is perpendicular to the first direction, and the cutting device is simple in structure and easy to design and process for molding.

According to some embodiments of the present disclosure, the base comprises a first base body and a second base body, wherein at least a portion of the first base body is capable of moving along the second direction relative to the second base body. The pair of cutting blades comprise a first cutting blade and a second cutting blade, wherein the first cutting blade is provided on the first base body, and the second cutting blade is provided on the second base body. The adjusting mechanism is configured to enable at least a portion of the first base body to undergo elastic deformation relative to the second base body along the second direction before or during the opening process of the pair of cutting blades driven by the drive mechanism, thereby forming the clearance between the first cutting blade and the second cutting blade along the second direction.

In the above solution, the first cutting blade is provided in the first base body to realize the positioning of the first cutting blade, and the second cutting blade is provided in the second base body to realize the positioning of the second cutting blade. The adjusting mechanism enables at least a portion of the first base body to undergo elastic deformation relative to the second base body along the second direction, thereby forming a clearance between the first cutting blade and the second cutting blade along the second direction.

According to some embodiments of the present disclosure, the first base body comprises a first portion and a second portion, wherein the first portion can undergo elastic deformation relative to the second portion along the second direction, and the second portion is connected to the second base body. The first cutting blade is arranged on the first portion.

In the above embodiment, since the first portion can undergo elastic deformation along the second direction relative to the second portion when the first cutting blade connected to the first portion undergoes elastic deformation in the first portion, a clearance is formed between the first cutting blade and the second cutting blade along the second direction, thus facilitating adjustment.

According to some embodiments of the present disclosure, at least one gap, which can undergo elastic deformation along the second direction, is provided between the first portion and the second portion. The adjusting mechanism is configured to adjust the elastic deformation of the gap.

In the above solution, the arrangement of the gap allows the first base body to undergo elastic deformation, thus forming a clearance between the pair of cutting blades along the second direction.

According to some embodiments of the present disclosure, the gap generally extends along a third direction, wherein the third direction is perpendicular to the second direction and the first direction.

In the above solution, the gap generally extends along the third direction so that the first base body can undergo elastic deformation along the second direction.

According to some embodiments of the present disclosure, the first base body comprises at least two first portions, and the first portion is arranged along the third direction. The third direction is perpendicular to the second direction and the first direction.

In the above solution, the first portion is arranged in the third direction to facilitate elastic deformation of the first base body, thus making it easier for the pair of cutting blades to form a clearance along the second direction.

According to some embodiments of the present disclosure, the pair of cutting blades comprises the first cutting blade and the second cutting blade, wherein the first cutting blade is movably connected to the first portion along the first direction, and the second cutting blade is fixed to the second base body.

In the above solution, the first cutting blade is capable of moving relative to the first portion along the first direction, and the second cutting blade is fixed to the second base body, thus ensuring stable coordination between the first cutting blade and the second cutting blade.

According to some embodiments of the present disclosure, the first portion is provided with a guide hole, and the cutting device further comprises a guide rod, extending along the first direction and inserted into the guide hole in a sliding manner, wherein the first cutting blade is fixed to the guide rod.

In the above embodiment, the first cutting blade is connected through the guide rod inserted into the guide hole, allowing the first cutting blade to move relative to the base along the first direction. This facilitates the opening and closing of the first cutting blade with the second cutting blade, thus ensuring stable movement of the first cutting blade.

According to some embodiments of the present disclosure, the gap comprises interconnected straight segment and curved segment, wherein the straight segment extends along the third direction, and the straight segment and the curved segment are alternately arranged along the third direction. The center of the guide hole coincides with the circle center of the curved segment.

In the above solution, the curved segment is configured to avoid the guide hole, thus ensuring a compact fit between the guide rod and the base and reducing the dimension of the base in the second direction.

According to some embodiments of the present disclosure, the extension line of the straight segment passes through the center of the guide hole.

In the above solution, the extension line of the straight segment passes through the center of the guide hole, thus making the fit between the guide rod and the base more compact.

According to some embodiments of the present disclosure, the first portion is provided with a weakened part.

In the above solution, the arrangement of the weakened part reduces the difficulty of the base undergoing elastic deformation.

According to some embodiments of the present disclosure, the weakened part comprises multiple through holes, with each through hole extending along the third direction. The multiple through holes are arranged along the second direction.

In the above solution, the arrangement of multiple through holes can weaken the base along the second direction, thus reducing the difficulty of the base undergoing elastic deformation along the second direction.

According to some embodiments of the present disclosure, the adjusting mechanism is mounted between the first portion and the second portion.

In the above solution, the adjustment mechanism is arranged in a position that facilitates driving the first portion to undergo elastic deformation relative to the second portion, and the adjustment is simple.

According to some embodiments of the present disclosure, the adjusting mechanism comprises a piezoelectric ceramic actuator.

In the above solution, the piezoelectric ceramic actuator is compact in structure and small in size.

In a second aspect, the present disclosure provides a cutting method comprising driving a pair of cutting blades to close to each other in a first direction to cut the material strip; forming a clearance between the pair of cutting blades in the second direction, wherein the second direction is a movement direction of the cutting material and intersects the first direction; and driving the pair of cutting blades to open along the first direction.

In a third aspect, the present disclosure provides a cutting apparatus comprising a conveying device, configured for conveying an electrode sheet; and the cutting device provided in any one of the above embodiments, configured for cutting the electrode sheet.

The additional aspects and advantages of the present disclosure will be partially disclosed in the following description, while some may become evident from the description or be understood through practical implementation of the present disclosure.

BRIEF DESCRIPTION OF DRAWINGS

To more clearly illustrate the technical solutions of the embodiments of the present disclosure, the following will briefly introduce the drawings used in the embodiments. It should be understood that the following drawings only show some embodiments of the present disclosure, and therefore they should not be regarded as a limitation on the scope. Those ordinary skilled in the art can also obtain other related drawings based on these drawings without inventive effort.

Figure 1:
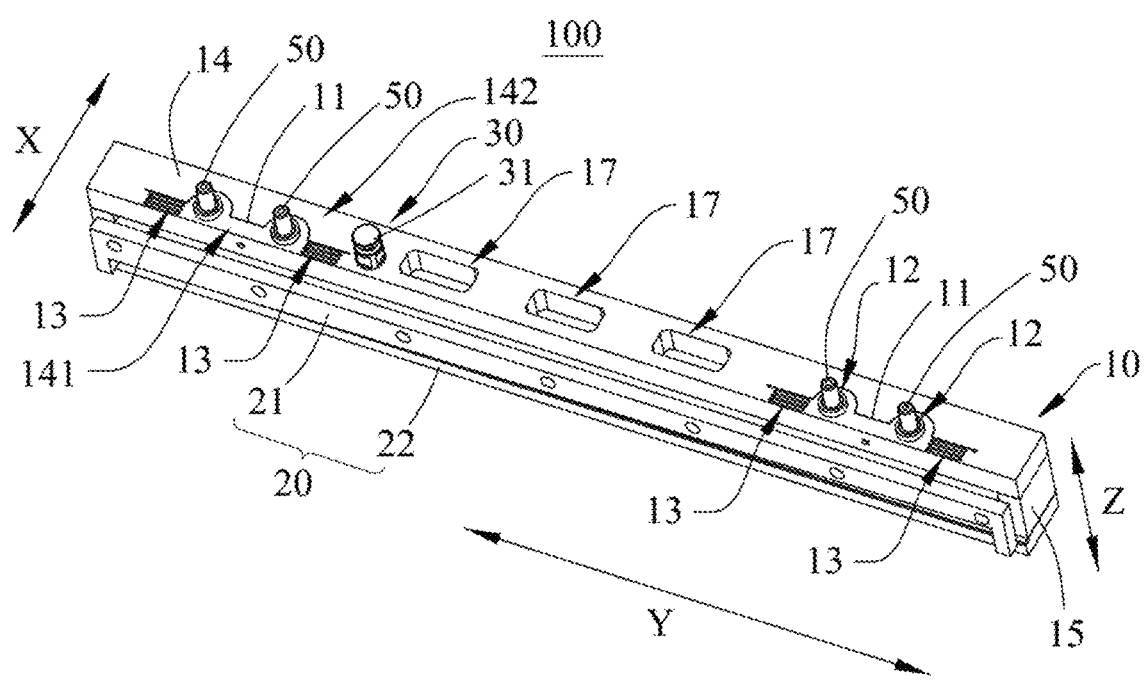
FIG. 1 is an axonometric view of a cutting device provided by some embodiments of the present disclosure.

In the drawings, the drawings are not drawn to actual scale.

Description of reference signs: 100—cutting device; 10—base; 11—gap; 111—straight segment; 112—curved segment; 12—guide hole; 13—weakened part; 131—through hole; 14—first base body; 141—first portion; 142—second portion; 15—second base body; 16—holding cavity; 17—hollow portion; 20—a pair of cutting blades; 21—first cutting blade; 22—second cutting blade; 30—drive mechanism; 31—driving connector; 40—adjusting mechanism; 50—guide rod; 60—connecting plate; 71—first stopper; 72—second stopper; 900—conveying device; 1000—cutting apparatus.

DETAILED DESCRIPTION OF EMBODIMENTS

The following will provide a detailed description of the embodiments of the technical solution of the present disclosure, in conjunction with the accompanying drawings. The following examples are provided solely for a clearer illustration of the technical solutions in the present disclosure. They are presented as examples and should not be used to limit the scope of protection of the present disclosure.

Unless otherwise defined, all technical and scientific terms used herein have the same meaning as understood by those skilled in the art of the relevant technical field. The terms used herein are used for the purpose of describing specific embodiments and are not intended to limit the present disclosure. The terms "comprise" and "provide" and their variations, as well as any other variations, are intended to cover non-exclusive inclusion in the summary and the claims of the present disclosure, as well as in the drawings.

In the description of the embodiments of the present disclosure, the technical terms "first", "second", etc. are used solely for the purpose of distinguishing different objects and should not be construed as indicating or implying relative importance or suggesting a specific quantity, specific order, or hierarchical relationship of the indicated technical features.

The term "embodiment" used herein means that specific features, structures, or characteristics described in conjunction with the embodiment can be included in at least one embodiment of the present disclosure. The use of this phrase in various parts of the summary does not necessarily refer to the same embodiment, nor does it imply that these embodiments are mutually exclusive or independent of each other. Those skilled in the art understand explicitly and implicitly that the embodiments described herein can be combined with other embodiments.

In the embodiments of the present disclosure, the term "and/or" is used as a way to describe the relationship between associated objects, indicating that there can be three possible relationships. For example, "A and/or B" can represent: the presence of A, the presence of both A and B, or the presence of B. Additionally, the character "/" in the present disclosure generally represents an "or" relationship between the preceding and following associated objects.

In the embodiments of the present disclosure, the term "multiple" refers to two or more (including two). Similarly, "multiple groups" refers to two or more groups (including two groups), and "multiple pieces" refers to two or more pieces (including two pieces), unless otherwise expressly and specifically limited.

Additionally, in the description of the embodiments of the present disclosure, technical terms such as "center", "longitudinal", "lateral", "length", "width", "thickness", "up", "down", "front", "back", "left", "right", "vertical", "horizontal", "top", "bottom", "inner", "outer", "clockwise", "counterclockwise", "axial direction", "radial direction", "circumferential direction", indicating orientations or positional relationships, are based on the orientations or positional relationships shown in the drawings. These terms are used for facilitating the description of the embodiments of the present disclosure and simplifying the description, and should not be construed as indicating or implying that the devices or components referred to must have specific orientations or be constructed and operated in specific orientations. Therefore, they should not be understood as limiting the embodiments of the present disclosure.

In the description of the embodiments of the present disclosure, unless otherwise expressly specified and limited, technical terms such as "provide", "link", "connect", "fix", and similar terms should be broadly interpreted. For example, they can be fixed connections, detachable connections, or integral connections. They can also be mechanical connections or electrical connections. They can also be direct connections or indirect connections through intermediate media. Furthermore, they can be internal connections within two components or the interaction between two components. Those of ordinary skill in the art can understand the meanings of the above terms in the embodiments of the present disclosure according to specific situations.

The batteries mentioned in the embodiments of the present disclosure refer to a single physical module that comprises one or multiple battery cells to provide higher voltage and capacity. For example, the batteries mentioned in the present disclosure can comprise battery modules or battery packs.

The batteries mentioned in the embodiments of the present disclosure refer to a single physical module that comprises one or multiple battery cells to provide higher voltage and capacity. For example, the batteries mentioned in the present disclosure can comprise battery modules or battery packs.

A battery cell comprises an electrode assembly and an electrolyte. The electrode assembly is composed of a positive electrode sheet, a negative electrode sheet, and a separator. The battery cells work primarily on the movement of metal ions between the positive electrode sheet and the negative electrode sheet. The positive electrode sheet comprises a positive current collector and a positive active material layer. The positive electrode active material layer is coated on a surface of the positive electrode current collector, and the current collector not coated with the positive electrode active material layer protrudes from the current collector coated with the positive electrode active material layer. The current collector not coated with the positive electrode active material layer serves as the positive terminal tab. In the case of lithium-ion batteries, the material for the positive electrode current collector can be aluminum, and the positive active material can be lithium cobalt oxide, lithium iron phosphate, lithium manganese oxide, or lithium nickel cobalt manganese oxide. The negative electrode sheet comprises a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer. The current collector not coated with the negative electrode active material layer serves as the negative terminal tab. The material of the negative electrode current collector can be copper, and the negative active material can be carbon or silicon, and so on. To ensure that there is no fuse blow during high current flow, the number of positive electrode tabs are plurality and stacked together, and the number of negative electrode tabs are plurality and stacked together. The material of the separator can be PP (polypropylene), PE (polyethylene), and so on.

In the production of electrode sheets, the electrode sheets are usually wound into rolls for movement between processes. Due to the longer length of the material strip of the electrode sheet, the material strip of the electrode sheet needs to be cut during the process of manufacturing the battery to obtain the electrode sheet with the desired length.

In the related technology, a cutting device is usually used to cut the material strip, and the cutting device includes a pair of cutting blades. The pair of cutting blades are closed to each other to cut the material strip. The inventor found that when the cutting is completed, the pair of cutting blades open. During the process of opening the cutting blades, the material strip will follow the movement of the cutting blade.

This results in the cutting blades easy to scrape the material strip, thus damaging the material strip. Therefore, the cutting quality of the material strip is poor. For example, taking the material strip as an example of an electrode sheet, when cutting the electrode sheet, the cutting blade scrapes the electrode sheet, which is likely to cause the active substance layer of the electrode sheet to be scraped off, thereby decreasing the active substance capacity of the electrode sheet. In serious cases, the surface of the electrode sheet forms deep scratches, which affects the strength of the electrode sheet, thus leading to breakage of the electrode sheet in the subsequent processing and affecting the performance of the electrode sheet.

In view of this, in order to solve the problem of poor cutting quality of the material strip, the inventor, after in-depth research, designed a cutting device, wherein the cutting device includes a base, a pair of cutting blades, a drive mechanism, and an adjusting mechanism. The drive mechanism is configured to drive the pair of cutting blades to close or open to each other in a first direction. The adjusting mechanism is configured to drive the base to undergo elastic deformation in a second direction before or during an opening process of the pair of cutting blades driven by the drive mechanism, so as to increase the movement clearance of the pair of cutting blades. The second direction intersects the first direction. The base is driven by the adjusting mechanism to undergo elastic deformation in the second direction, thus increasing the movement clearance of the pair of cutting blades. This reduces the risk of the cutting blades contacting the material strip in the process of opening, thus improving the cutting quality of the material strip.

When the cutting device is applied to cut the material strip, the base is driven to undergo elastic deformation in the second direction before or during an opening process of the pair of cutting blades driven by the drive mechanism, so as to increase the movement clearance of the pair of cutting blades. This reduces the risk of the pair of cutting blades contacting the material strip during the process of opening, decreases the probability of the pair of cutting blades scraping the material strip, and improves the cutting quality of the material strip.

Figure 2:
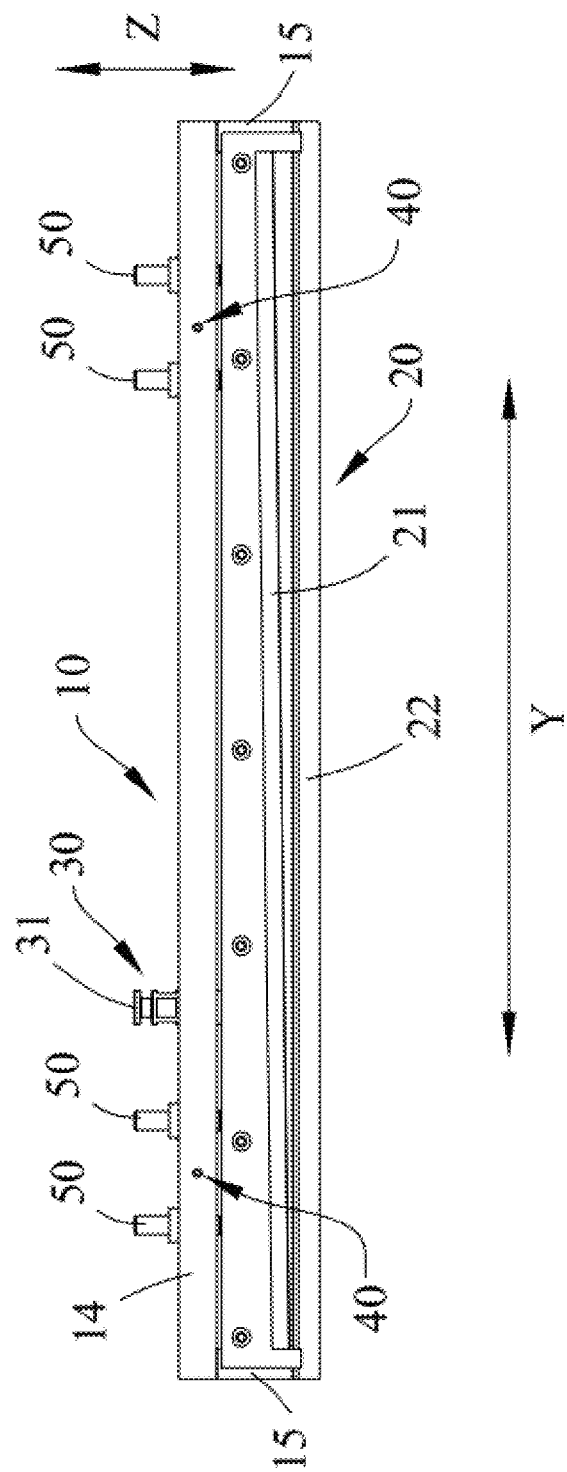
FIG. 2 is a structural schematic diagram of the cutting device provided in some embodiments of the present disclosure.
Figure 3:
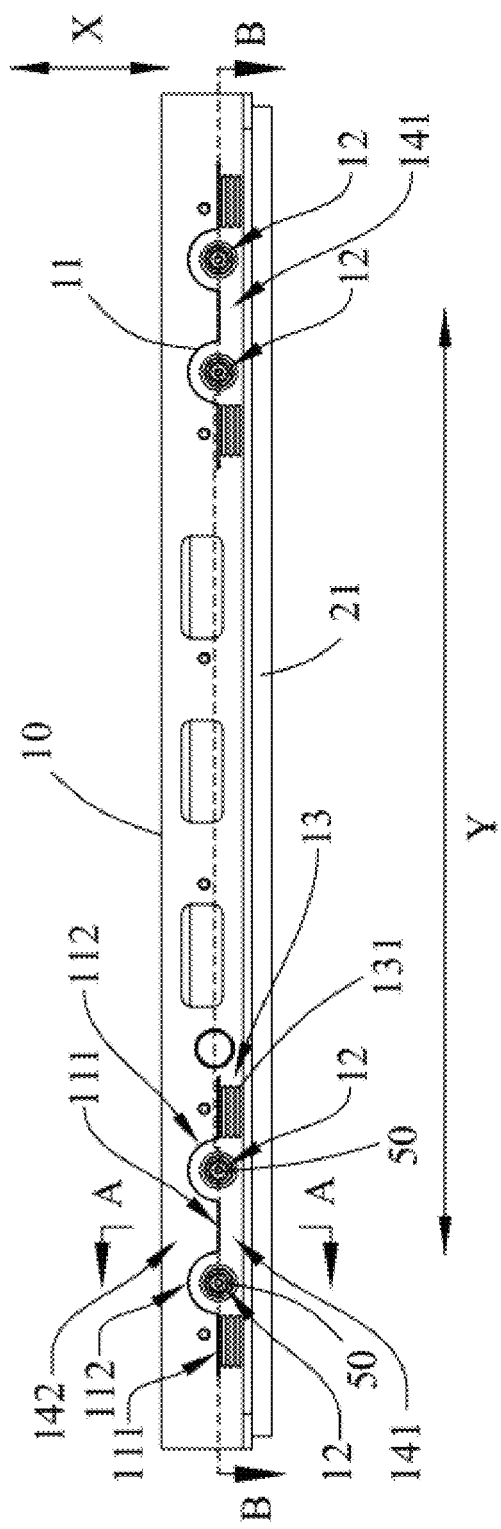
FIG. 3 is a structural schematic diagram of a gap of a base provided in some embodiments of the present disclosure.
Figure 4:
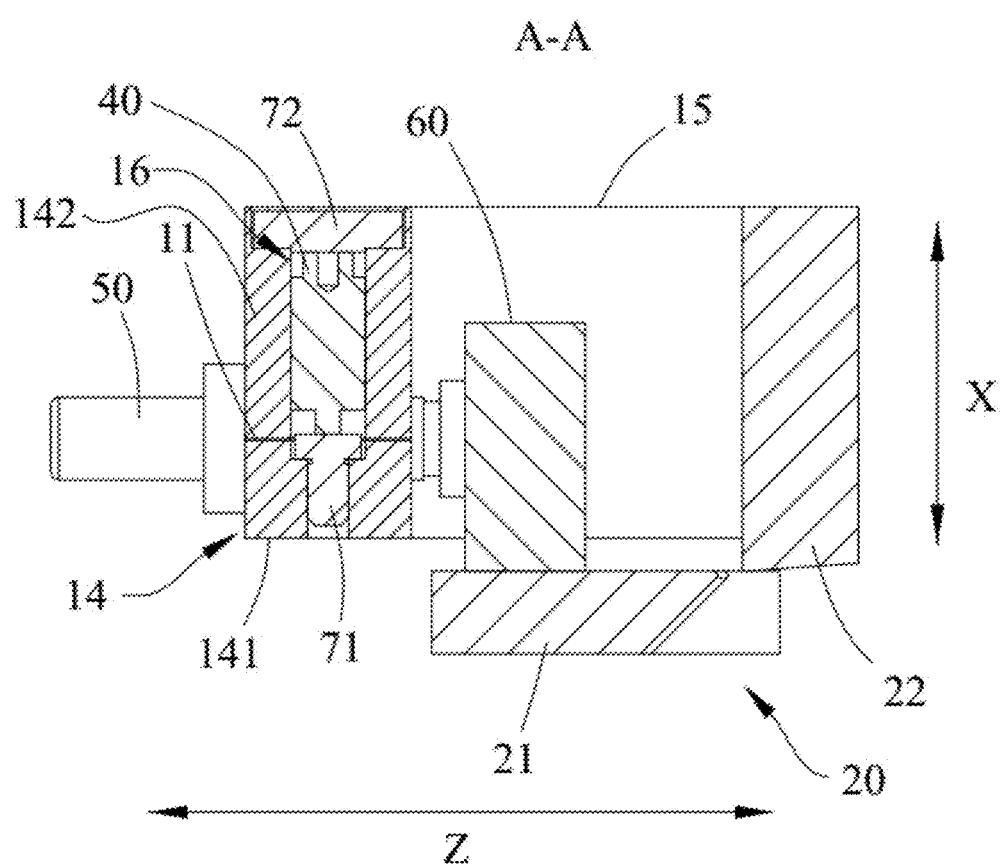
FIG. 4 is a sectional view of FIG. 3 in the A-A direction.
Figure 5:
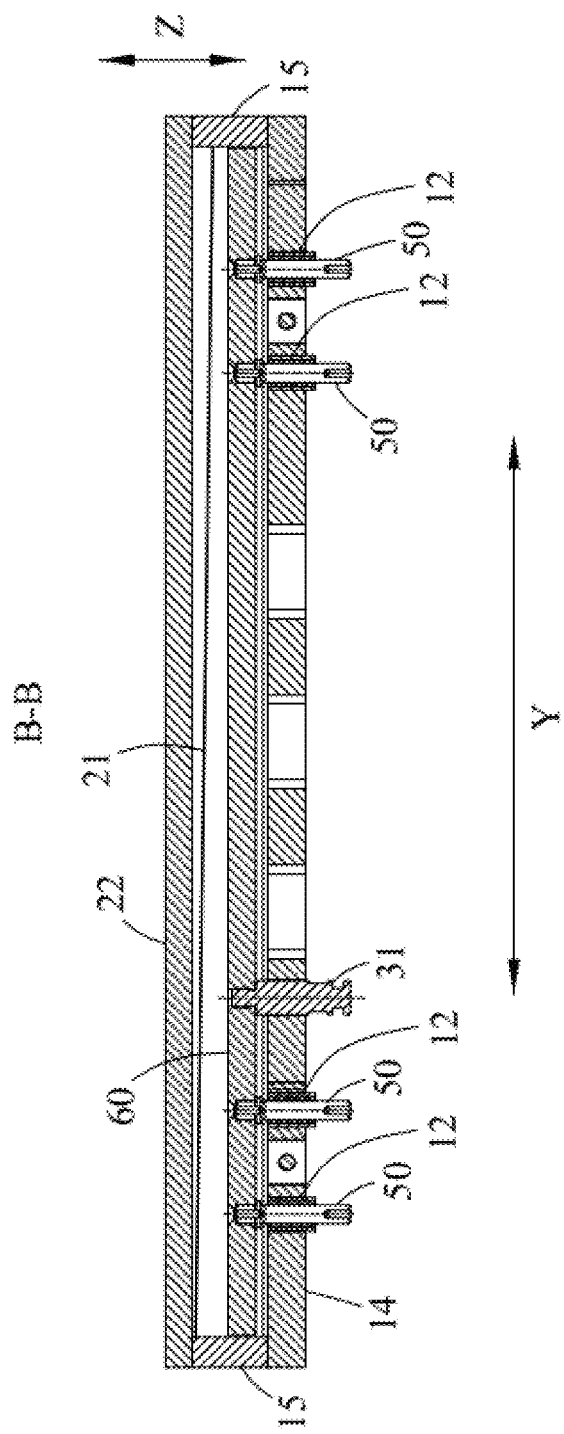
FIG. 5 is a sectional view of FIG. 3 in the B-B direction.

Referring to FIGS. 1 to 5, FIG. 1 is an axonometric view of a cutting device provided by some embodiments of the present disclosure; FIG. 2 is a structural schematic diagram of the cutting device provided in some embodiments of the present disclosure; FIG. 3 is a structural schematic diagram of a gap of a base provided in some embodiments of the present disclosure; FIG. 4 is a sectional view of FIG. 3 in the A-A direction, and FIG. 5 is a sectional view of FIG. 3 in the B-B direction.

According to some embodiments of the present disclosure, with reference to FIGS. 1 to 5, the present disclosure provides a cutting device 100. The cutting device 100 includes a base 10, a pair of cutting blades 20, a drive mechanism 30, and an adjusting mechanism 40. The drive mechanism 30 is configured to drive the pair of cutting blades 20 to close or open to each other in a first direction Z. The adjusting mechanism 40 is configured to drive at least a portion of the base 10 to undergo elastic deformation in a second direction X before or during an opening process of the pair of cutting blades 20 driven by the drive mechanism 30, so as to form a clearance between the pair of cutting blades 20 in the second direction X. The second direction X is a movement direction of a cutting material and intersects with the first direction Z.

In the drawing, the direction indicated by the letter Z is the first direction, and the direction indicated by the letter X is the second direction. The second direction X is the movement direction of the cutting material, which means that the cutting material moves along the second direction X.

The pair of cutting blades 20 are closed to each other along the first direction Z, which means that the pair of cutting blades 20 are close to each other in the first direction Z so as to cut the material disposed between the pair of cutting blades 20. The pair of cutting blades 20 are open along the first direction Z, which means that the blades of the pair of cutting blades 20 are far away from each other in the first direction Z to reset for the next cutting of the material strip.

There are various embodiments of the pair of cutting blades 20 being closed or open to each other along the first direction Z. For example, one of the pair of cutting blades 20 moves closer to or further away from the other along the first direction Z. Alternatively, the pair of cutting blades 20 move in opposite directions at the same time.

In order to cut the material strip, there is no clearance between the pair of cutting blades 20 in the second direction. The adjusting mechanism 40 drives the base 10 to undergo elastic deformation, which causes the pair of cutting blades 20 to form a clearance in the second direction.

The clearance of the pair of cutting blades 20 in the second direction is the distance between the mutually approaching surfaces of the pair of cutting blades 20 in the second direction X.

The thickness direction of the pair of cutting blades 20 can be arranged parallel to the second direction X or can be arranged inclined to the second direction X.

The conveying direction of the material strip can be provided parallel to the second direction X, and the cutting device 100 cuts the material strip along the width direction of the material strip; alternatively, the conveying direction of the material strip can be provided inclined to the second direction X, and the cutting device 100 cuts the material strip along the width direction inclined to the material strip.

The second direction X intersects the first direction Z. The second direction X can be perpendicular to the first direction Z. Alternatively, the second direction X can be arranged inclined to the first direction Z.

The pair of cutting blades 20 can be ordinary cutting blades or ultrasonic cutting blades.

The drive mechanism 30 and the adjusting mechanism 40 can be electrically controlled mechanisms to achieve automated cutting operations.

In some embodiments of the present disclosure, the material strip can be an electrode sheet, and the electrode sheet is a component configured for forming the electrode assembly of a battery cell. In other embodiments, the material strip can also be a composite material strip formed after the electrode sheet is laminated with the separator, or it can be other forms of composite material strips that have higher requirements for surface quality.

Elastic deformation is a phenomenon in which a material is deformed by an external force and the deformation disappears completely when the force is removed.

The base 10 undergoing elastic deformation along the second direction X means that at least a localized region of the base 10 undergoes elastic deformation along the second direction X under the action of the adjusting mechanism 40, thus resulting in a smaller change in the position of a component on the localized area. The elastic deformation of the base 10 is a recoverable deformation, and the base 10 returns to its original state when the force acting on the base 10 by the adjusting mechanism 40 disappears. It is noted that where the adjustment mechanism 40 drives the base 10 to undergo elastic deformation along the second direction X, the elastic deformation can occur in a partial region of the base 10, or the elastic deformation can occur in the whole base 10, so as to form a clearance between the pair of cutting blades 20 along the second direction.

The clearance between the pair of cutting blades 20 along the second direction can be formed due to positional changes of both cutting blades 20 under the elastic deformation of the base 10; or it can be due to positional changes of one of the cutting blades 20 under the elastic deformation of the base 10, while the position of the other one remains unchanged.

According to the cutting device 100 of the embodiments of the present disclosure, the adjusting mechanism 40 drives the base 10 to undergo elastic deformation in a second direction X before or during an opening process of the pair of cutting blades 20 driven by the drive mechanism 30, so as to form a clearance between the pair of cutting blades 20 in the second direction. This reduces the risk of the pair of cutting blades 20 contacting the material strip during the process of opening, thereby decreasing the probability of the pair of cutting blades 20 scraping the material strip and improving the cutting quality of the material strip.

According to some embodiments of the present disclosure, the second direction X is perpendicular to the first direction Z.

The first direction Z can be vertical, horizontal, or otherwise. For example, the first direction Z is a vertical direction, the second direction X is a horizontal direction, the material strip is conveyed in the horizontal direction, and the thickness direction of the material strip extends in the vertical direction. For example, the first direction Z is a horizontal direction, the second direction X is a vertical direction, the material strip is conveyed in the vertical direction, and the thickness direction of the material strip extends in the horizontal direction.

The second direction X is perpendicular to the first direction Z. In other words, the mutual closing or opening direction of the pair of cutting blades 20 is arranged perpendicular to the direction of adjustment of the movement clearance of the pair of cutting blades 20. Compared to the way in which the second direction X is arranged inclined to the first direction Z, the second direction X is perpendicular to the first direction Z, which makes the cutting device 100 simpler in construction and easier to design and process for molding.

According to some embodiments of the present disclosure, the base 10 comprises a first base body 14 and a second base body 15, wherein at least a portion of the first base body 14 is capable of moving along the second direction X relative to the second base body 15. The pair of cutting blades 20 comprise a first cutting blade 21 and a second cutting blade 22, wherein the first cutting blade 21 is provided on the first base body 14 and the second cutting blade 22 is provided on the second base body 15. The adjusting mechanism 40 is configured to enable at least a portion of the first base body 14 to undergo elastic deformation relative to the second base body 15 along the second direction X before or during the opening process of the pair of cutting blades 20 driven by the drive mechanism 30, thereby forming the clearance between the first cutting blade 21 and the second cutting blade 22 along the second direction X.

The first base body 14 and the second base body 15 can be connected in one piece, or, the first base body 14 and the second base body 15 can be integrally molded.

It is noted that at least a portion of the first base body 14 is capable of moving in the second direction relative to the second base body 15 so that at least a portion of the first base body 14 can undergo elastic deformation along the second direction X relative to the second base body 15. The portion of the first base body 14 is capable of undergoing elastic deformation relative to the second base body 15 along the second direction X. Alternatively, the whole first base body 14 undergoes elastic deformation relative to the second base body 15 along the second direction X.

The first cutting blade 21 is provided in the first base body 14 to realize positioning of the first cutting blade 21, and the second cutting blade 22 is provided in the second base body 15 to realize positioning of the second cutting blade 22. The adjusting mechanism 40 enables at least a portion of the first base body 14 to undergo elastic deformation relative to the second base body 15 along the second direction X, thereby forming a clearance between the first cutting blade 21 and the second cutting blade 22 along the second direction X.

According to some embodiments of the present disclosure, the first base body 14 comprises a first portion 141 and a second portion 142, wherein the first portion 141 can undergo elastic deformation relative to the second portion 142 along the second direction X, and the second portion 142 is connected to the second base body 15. The first cutting blade 21 is arranged on the first portion 141.

The first portion 141 can undergo elastic deformation relative to the second portion 142 along the second direction X, and the second portion 142 is connected to the second base body 15. It is understood that the first portion 141 is a portion on the first base body 14 capable of undergoing elastic deformation, that is to say, the first portion 141 is susceptible to elastic deformation relative to the second portion 142.

Since the first portion 141 can undergo elastic deformation along the second direction X relative to the second portion 142, when the first cutting blade 21 connected to the first portion 141 undergoes elastic deformation in the first portion 141, a clearance is formed between the first cutting blade 21 and the second cutting blade 22 along the second direction X, thus facilitating adjustment.

According to some embodiments of the present disclosure, at least one gap 11, which can undergo elastic deformation along the second direction, is provided between the first portion 141 and the second portion 142. The adjusting mechanism 40 is configured to adjust the elastic deformation of the gap 11.

The gap 11 is a slit opened on the first base body 14. When the first portion 141 undergoes elastic deformation relative to the second portion 142, it can be understood that the size of the gap 11 changes, and that the gap 11 becomes larger so as to cause the first cutting blade 21 and the second cutting blade 22 to form a clearance in the second direction X. Optionally, the gap 11 penetrates through the first base body 14 along the first direction Z so that the first base body 14 is susceptible to elastic deformation.

The arrangement of the gap 11 allows the first base body 14 to undergo elastic deformation, thus forming a clearance between the pair of cutting blades 20 along the second direction X.

According to some embodiments of the present disclosure, as shown in FIGS. 1 and 3, the gap 11 generally extends along a third direction Y, wherein the third direction Y is perpendicular to the second direction X and the first direction Z.

In the drawing, the direction indicated by the letter Y is the third direction. The third direction Y is perpendicular to the second direction X and is perpendicular to the first direction Z.

The length direction of the pair of cutting blades 20 can extend in the third direction Y.

The gap 11 extending generally along the third direction Y means that the gap 11 extends substantially along the third direction Y. In other words, the length direction of the gap 11 is the third direction Y. Optionally, the lines connecting the two endpoints of the gap 11 can be parallel to the third direction Y. For example, when the gap 11 is structured in a straight line, the gap 11 extends along the third direction Y. For example, the most region of the gap 11 extends along the third direction Y, and an individual region extends along a direction intersecting the third direction Y.

Since the gap 11 extends generally along the third direction Y and the third direction Y is perpendicular to the second direction X, the width direction of the gap 11 is the second direction X so as to enable the base 10 to undergo elastic deformation along the second direction X.

According to some embodiments of the present disclosure, the first base body 14 comprises at least two first portions 141, and the first portion 141 is arranged along the third direction Y. The third direction Y is perpendicular to the second direction X and the first direction Z.

The arrangement of the first portions 141 along the third direction Y means that multiple first portions 141 are arranged at intervals along the third direction Y. In the third direction Y, the multiple first portions 141 are arranged in sequence.

The first portion 141 is arranged in the third direction Y to facilitate elastic deformation of the first base body 14, thus making it easier for the pair of cutting blades 20 to form a clearance along the second direction X.

According to some embodiments of the present disclosure, as shown in FIGS. 1, 2, and 4, the pair of cutting blades 20 comprises the first cutting blade 21 and the second cutting blade 22, wherein the first cutting blade 21 is movably connected to the first portion 141 along the first direction Z, and the second cutting blade 22 is fixed to the second base body 15.

The first cutting blade 21 is movably connected to the first portion 141 along the first direction Z, such that the first cutting blade 21 is capable of moving in a first direction Z relative to the first portion 141. When the first cutting blade 21 moves in the first direction Z, it is possible to realize mutual closure or opening of the first cutting blade 21 and the second cutting blade 22.

The first cutting blade 21 is capable of moving relative to the first portion 141 along the first direction Z, and the second cutting blade 22 is fixed to the second base body 15, thus ensuring stable coordination between the first cutting blade 21 and the second cutting blade 22.

According to some embodiments of the present disclosure, as shown in FIGS. 2 and 5, the first portion 141 is provided with a guide hole 12, and the cutting device 100 further comprises a guide rod 50, wherein the guide rod 50 extends along the first direction Z and inserted into the guide hole 12 in a sliding manner, wherein the first cutting blade 21 is fixed to the guide rod 50.

The guide hole 12 is a hole provided in the first portion 141 and extends in the first direction Z. Optionally, the guide hole 12 can be a through hole, or, the guide hole 12 can be a blind hole. In order to ensure a stable fit between the guide rod 50 and the guide hole 12, the guide hole 12 can be a through hole, with both ends of the guide rod 50, respectively, exposed at each end of the guide hole 12.

The guide rod 50 is a rod-like structure configured to cooperate with the guide hole 12 to realize the movement guidance of the first cutting blade 21 relative to the base 10, thus ensuring that the first cutting blade 21 moves along the first direction Z.

The first cutting blade 21 is connected through the guide rod 50 inserted into the guide hole 12, allowing the first cutting blade 21 to move relative to the base 10 along the first direction Z. This facilitates the opening and closing of the first cutting blade 21 with the second cutting blade 22, thus ensuring stable movement of the first cutting blade 21.

According to some embodiments of the present disclosure, as shown in FIG. 1 and FIG. 3, the guide hole 12 is arranged on one side of the gap 11.

The guide hole 12 is arranged on one side of the gap 11, which means that the guide hole 12 is arranged on a side of the gap 11 along the second direction X. The guide hole 12 is the location where the guide rod 50 cooperates with the first portion 141, i.e., the location where the first cutting blade 21 cooperates with the first portion 141. When the base 10 undergoes elastic deformation and the size of the gap 11 is changed, the position of the guide hole 12 is changed, such that the position of the first cutting blade 21 is changed, thereby forming a clearance between the first cutting blade 21 and the second cutting blade 22 in the second direction X.

The guide hole 12 is located on one side of the gap 11 so as to facilitate a change in the position of the guide rod 50 when the size of the gap 11 changes, which in turn forms a clearance between the first cutting blade 21 and the second cutting blade 22 in the second direction X.

According to some embodiments of the present disclosure, as shown in FIG. 1 and FIG. 3, the gap 11 comprises interconnected straight segment 111 and curved segment 112, wherein the straight segment 111 extends along the third direction Y, and the straight segment 111 and the curved segment 112 are alternately arranged along the third direction Y. The center of the guide hole 12 coincides with the circle center of the curved segment 112.

The straight segment 111 and the curved segment 112 are alternately provided along the third direction Y, meaning that multiple straight segments 111 and multiple curved segments 112 are provided. Two adjacent straight segments 111 are connected by the curved segment 112, and two adjacent curved segments 112 are connected by the straight segment 111.

As shown in FIGS. 1 and 3, the first base body 14 is provided with multiple guide holes 12, wherein the multiple guide holes 12 are arranged at intervals along the third direction Y. Correspondingly, multiple guide rods 50 are provided, wherein the multiple guide rods 50 correspond one-to-one with the multiple guide holes 12, and each guide rod 50 is inserted in the corresponding guide hole 12. Each guide hole 12 corresponds to one curved segment 112. In the embodiment, multiple connection positions are provided on the first cutting blade 21 and the first base body 14 along the third direction Y. Since the length direction of the first cutting blade 21 is the third direction Y, multiple connection positions are provided on the first cutting blade 21 and the base 10 along the third direction Y, thus ensuring that the first cutting blade 21 moves smoothly relative to the base 10.

The circle center of the curved segment 112 coincides with the center of the guide hole 12, and the curved segment 112 is arched toward the side of the gap 11 away from the guide hole 12; and the curved segment 112 is configured to avoid the guide hole 12 so as to ensure a compact fit between the guide rod 50 and the base 10, and to reduce the dimension of the base 10 in the second direction X.

According to some embodiments of the present disclosure, an extension line of the straight segment 111 passes through the center of the guide hole 12.

The extension line of the straight segment 111 passes through the center of the guide hole 12. In other words, the curved segment 112 is of a semicircular structure.

In the above solution, the extension line of the straight segment 111 passes through the center of the guide hole 12, thus making the fit between the guide rod 50 and the base 10 more compact.

According to some embodiments of the present disclosure, the first portion 141 is provided with a weakened part 13. As shown in FIG. 1 and FIG. 3, the weakened part 13 and the guide hole 12 are located on the same side of the gap 11.

The weakened part 13 is a region on the first portion 141 configured for reducing the elastic deformation produced by the base 10. For example, the weakened part 13 can be a structure such as a through hole or a slit on the base 10.

By providing the weakened part 13, the difficulty of undergoing elastic deformation by the base 10 is reduced, and it is easy to undergo elastic deformation by a localized region of the base 10.

According to some embodiments of the present disclosure, as shown in FIGS. 1 and 3, the first portion 141 is provided with multiple weakened parts 13, wherein the multiple weakened parts 13 are arranged at intervals along the third direction Y.

The arrangement of multiple weakened parts 13 can weaken the base 10 at multiple positions in the third direction Y, thus reducing the difficulty of the base 10 undergoing elastic deformation.

According to some embodiments of the present disclosure, as shown in FIGS. 1 and 2, the weakened part 13 comprises multiple through holes 131, with each through hole 131 extending along the third direction Y. The multiple through holes 131 are arranged along the second direction X.

Each through hole 131 extends along the third direction Y such that the extension direction of the through hole 131 is parallel to the extension direction of the gap 11. This facilitates easy elastic deformation of the base 10.

In the above solution, the arrangement of multiple through holes 131 can weaken the base 10 along the second direction X, thus reducing the difficulty of the base 10 undergoing elastic deformation along the second direction X.

According to some embodiments of the present disclosure, as shown in FIG. 2 and FIG. 5, the second cutting blade 22 is fixed to both ends of the base 10 along the third direction Y.

In the above solution, the second cutting blade 22 is fixed to both ends of the base 10 along the third direction Y, so as to facilitate the arrangement of other components in the region between both ends of the base 10 and to rationally utilize the mounting space.

As shown in FIGS. 2 and 5, the base 10 comprises a first base body 14 and two second base bodies 15, and the two second base bodies 15 are connected to both ends of the first base body 14 along the third direction Y. The second cutting blade 22 is fixed to the two second base bodies 15, the first cutting blade 21 is connected to the first base body 14, and the gap 11 penetrates through the first base body 14 along the first direction Z. The first base body 14, the two second base bodies 15, and the second cutting blade 22 enclose the holding space. The cutting device 100 further comprises a connecting plate 60, and the connecting plate 60 is provided in the holding space. The guide rod 50 is inserted in the first base body 14. One end of the guide rod 50 is connected to the connecting plate 60, and the first cutting blade 21 is connected to the connecting plate 60, which makes the structure of the cutting device 100 compact and facilitates the assembly of the first cutting blade 21 and the base 10.

According to some embodiments of the present disclosure, the adjusting mechanism 40 is mounted between the first portion 141 and the second portion 142.

The adjusting mechanism 40 is mounted between the first portion 141 and the second portion 142 so as to facilitate the positioning and supporting for the adjusting mechanism 40.

The adjustment mechanism 40 is configured to adjust the size of the gap 11, where adjusting the size of the gap 11 by the adjustment mechanism 40 facilitates driving the first portion 141 to undergo elastic deformation in the second direction X relative to the second portion 142. This enables the pair of cutting blades 20 to form a clearance in the second direction X, and the adjustment is simple.

According to some embodiments of the present disclosure, as shown in FIG. 4, the base 10 is provided with a holding cavity 16 in communication with the gap 11, and the adjusting mechanism 40 is arranged within the holding cavity 16.

In the above solution, the adjusting mechanism 40 is provided in the holding cavity 16, which facilitates the protection for the adjusting mechanism 40. At the same time, the cutting device 100 is compact in structure, thus reducing space occupation.

As shown in FIG. 4, the holding cavity 16 extends along the second direction X. Two ends of the holding cavity 16 are arranged on both sides of the gap 11. Two ends of the adjusting mechanism 40 along the second direction X are each connected to the base 10 so as to facilitate adjustment of the size of the gap 11. Optionally, the holding cavity 16 is of a structure with openings at both ends, thus facilitating the arrangement of the adjustment mechanism 40 within the holding cavity 16. A first stopper 71 is provided at an opening of one end of the holding cavity 16, and the first stopper 71 is arranged between the adjusting mechanism 40 and the base 10. A second stopper 72 is provided in an opening of another end of the holding cavity 16, and the second stopper 72 is detachably connected to the base 10. For example, the second stopper 72 can be threadedly connected to the base 10, or the second stopper 72 can be snap-fit to the base 10, thus avoiding disengagement of the adjusting mechanism 40 from the holding cavity 16.

According to some embodiments of the present disclosure, the adjusting mechanism 40 comprises a piezoelectric ceramic actuator.

The piezoelectric ceramic actuator has the advantages of high precision, short response time, compact structure, and small size.

The piezoelectric ceramic using its material properties under the action of voltage can undergo mechanical deformation, which causes relative displacement of internal positive and negative charge centers under mechanical stress, resulting in polarization, i.e., having the piezoelectric effect. Under energized conditions, the piezoelectric ceramics can elongate along the direction of electrode distribution (i.e., the second direction X), and shorten back to their original size when de-energized.

When the piezoelectric ceramic actuator is energized, the piezoelectric ceramic deforms, elongating along the second direction X, thereby driving the base 10 to undergo elastic deformation. This results in an increase in the width of the gap 11. When the piezoelectric ceramic actuator is de-energized, the piezoelectric ceramic deforms, retracting along the second direction X. The base 10 returns to its initial state under the influence of its own material properties.

Optionally, the piezoelectric ceramic actuator is cylindrical.

According to some embodiments of the present disclosure, the adjusting mechanism 40 can also be an electric actuator, an electrode screw nut mechanism, and the like.

According to some embodiments of the present disclosure, as shown in FIGS. 1 and 5, the drive mechanism 30 comprises a driving connector 31, wherein the driving connector 31 is arranged on the base 10 along the first direction Z in a moving manner. One end of the driving connector 31 is connected to a power source, and the driving connector 31 moves along the first direction Z under the action of the power source, thereby driving the pair of cutting blades 20 to close or open each other along the first direction Z.

Optionally, in embodiments where the cutting device 100 comprises a connecting plate 60, one end of the driving connector 31 is connected to the connecting plate 60 and the other end is connected to a power source. When the driving connector 31 moves along the first direction Z to drive the connecting plate 60, the connecting plate 60 moves along the first direction Z to drive the first cutting blade 21, thereby causing the first cutting blade 21 to move closer to or further away from the second cutting blade 22. The power source can be in the form of a combination of a motor and a cam, or the power source can be an electric actuator, or the power source can be some other linear drive mechanism 30.

According to some embodiments of the present disclosure, the base 10 is further provided with a hollow portion 17 configured for reducing the weight of the base 10.

According to some embodiments of the present disclosure, as shown in FIG. 2, the blade of the first cutting blade 21 is arranged at an angle to the blade of the second cutting blade 22 so as to have a better cutting effect on the material strip.

According to some embodiments of the present disclosure, with reference to FIGS. 1 to 5, the present disclosure provides a cutting device 100. The cutting device 100 comprises a base 10, a pair of cutting blades 20, a drive mechanism 30, and an adjusting mechanism 40. The pair of cutting blades 20 comprises a first cutting blade 21 and a second cutting blade 22, wherein the first cutting blade 21 is connected to the base 10 along the first direction Z in a moving manner, and the second cutting blade 22 is fixed to both ends of the base 10 along the third direction Y. The drive mechanism 30 is configured to drive the first cutting blade 21 in the first direction Z to move the first cutting blade 21 closer to or further away from the second cutting blade 22. The base 10 is provided with a gap 11 and a guide hole 12, wherein the gap 11 extends generally along the third direction Y, and the gap 11 is configured to allow deformation of the base 10. The guide hole 12 extends along the first direction Z, and the guide hole 12 is arranged on a side of the width direction of the gap 11. The first cutting blade 21 is connected to a guide rod 50, wherein the guide rod 50 is inserted in the guide hole 12. The guide rod 50 is capable of moving in the first direction Z relative to the base 10, thus driving the first cutting blade 21 to move along the first direction Z. The adjusting mechanism 40 is a piezoelectric ceramic actuator configured for adjusting the size of the gap 11.

After the first cutting blade 21 and the second cutting blade 22 close to cut the material strip, the piezoelectric ceramic actuator is energized, and the piezoelectric ceramic actuator causes the width of the gap 11 to be larger, which in turn increases the movement clearance between the first cutting blade 21 and the second cutting blade 22 along the second direction X. This reduces the risk of contact between the pair of cutting blades 20 and the material strip during opening, lowers the probability of the pair of cutting blades 20 scraping the material strip, and improves the cutting quality of the material strip. When the pair of cutting blades 20 open, the piezoelectric ceramic actuator is de-energized and the base 10 returns to its initial state under the influence of its own material properties, so as to prepare for the next cutting operation.

Figure 6:
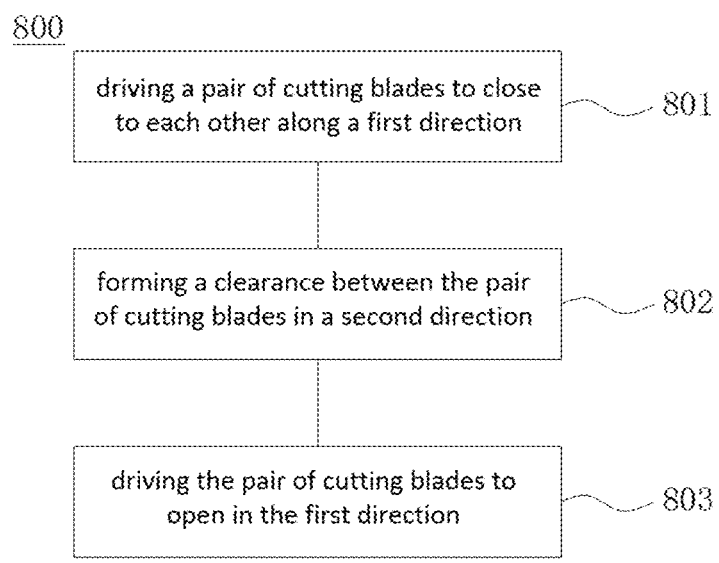
FIG. 6 is a schematic flowchart of a cutting method provided in some embodiments of the present disclosure.

FIG. 6 shows a schematic flowchart of a cutting method 800 provided in some embodiments of the present disclosure. According to some embodiments of the present disclosure, as shown in FIG. 6, the present disclosure provides a cutting method 800, wherein the cutting method 800 comprises the following steps.

S801: driving the pair of cutting blades 20 to close to each other along the first direction Z to cut the material strip.

S802: forming a clearance between the pair of cutting blades 20 in a second direction X, wherein the second direction X is the movement direction of the cutting material and intersects the first direction Z.

S803: driving the pair of cutting blades 20 to open along the first direction Z.

It is noted that driving the pair of cutting blades 20 to be closed to each other along the first direction Z means that the first cutting blade 21 and the second cutting blade 22 are driven closer to each other in the first direction Z. Driving the pair of cutting blades 20 open along the first direction Z means that the first cutting blade 21 and the second cutting blade 22 are driven away from each other in the first direction Z.

It is understood that the cutting method 800 of some embodiments of the present disclosure can, but is not limited to, be implemented using the cutting device 100 of any of the above embodiments.

Figure 7:
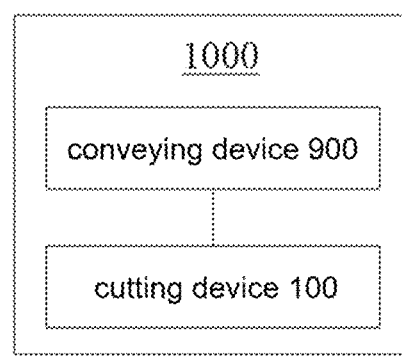
FIG. 7 is a schematic block diagram of a cutting apparatus provided by some embodiments of the present disclosure.

FIG. 7 is a schematic block diagram of a cutting apparatus 1000 provided in the embodiments of the present disclosure. According to some embodiments of the present disclosure, as shown in FIG. 7, the present disclosure further provides a cutting apparatus 1000, wherein the cutting apparatus 1000 comprises a conveying device 900 and a cutting device 100. The conveying device 900 is configured to convey the electrode sheet and the cutting device 100 is configured to cut the electrode sheet.

According to the cutting apparatus 1000 of the embodiments of the present disclosure, the cutting device 100 is provided with an adjusting mechanism 40, which can reduce the risk of the pair of cutting blades 20 scraping the material strip during the process of cutting and opening the material strip. The cutting quality of the material strip is higher, which meets the process requirements.

While preferred embodiments have been described and illustrated in the present disclosure, it is possible to make various improvements and replace components with equivalents within the scope of the present disclosure. In particular, as long as there are no structural conflicts, the various technical features mentioned in each embodiment can be combined in any way. The present disclosure is not limited to the specific embodiments disclosed herein but includes all technical solutions falling within the scope of the claims.

What is claimed is:

1. A cutting device, comprising
a base;
a pair of cutting blades, mounted on the base;
a drive mechanism, configured to drive the pair of cutting blades to close or open to each other in a first direction; and
an adjusting mechanism, configured to drive at least a portion of the base to undergo elastic deformation in a second direction before or during an opening process of the pair of cutting blades driven by the drive mechanism, so as to form a clearance between the pair of cutting blades in the second direction, wherein the second direction is a movement direction of a cutting material and intersects with the first direction,
wherein the base comprises a first base body and a second base body, and at least a portion of the first base body is capable of moving along the second direction relative to the second base body, the pair of cutting blades comprise a first cutting blade and a second cutting blade, the first cutting blade is provided on the first base body and the second cutting blade is provided on the second base body, the adjusting mechanism is configured to enable at least a portion of the first base body to undergo elastic deformation relative to the second base body along the second direction before or during the opening process of the pair of cutting blades driven by the drive mechanism, thereby forming the clearance between the first cutting blade and the second cutting blade along the second direction.

2. The cutting device according to claim 1, wherein the second direction is perpendicular to the first direction.

3. The cutting device according to claim 1, wherein the first base body comprises a first portion and a second portion; the first portion can undergo elastic deformation relative to the second base body along the second direction, and the second portion is connected to the second base body; and the first cutting blade is arranged on the first portion.

4. The cutting device according to claim 3, wherein at least one gap, which can undergo elastic deformation along the second direction, is provided between the first portion and the second portion; and the adjusting mechanism is configured to adjust the elastic deformation of the gap.

5. The cutting device according to claim 4, wherein the gap generally extends along a third direction, and the third direction is perpendicular to the second direction and the first direction.

6. The cutting device according to claim 4, wherein the first base body comprises at least two first portions; the first portions are arranged along a third direction; and the third direction is perpendicular to the second direction and the first direction.

7. The cutting device according to claim 4, wherein the first portion is provided with a guide hole, and the cutting device further comprises:
a guide rod, extending in the first direction and slidably inserted through the guide hole,
wherein the first cutting blade is fixed to the guide rod.

8. The cutting device according to claim 7, wherein the gap comprises interconnected straight segment and curved segment; the straight segment extends along a third direction, the third direction is perpendicular to the second direction and the first direction; the straight segment and the curved segment are alternately arranged along the third direction; and a center of the guide hole coincides with a circle center of the curved segment.

9. The cutting device according to claim 8, wherein an extension line of the straight segment passes through the center of the guide hole.

10. The cutting device according to claim 3, wherein the pair of cutting blades comprises the first cutting blade and the second cutting blade; the first cutting blade is connected to the first portion along the first direction in a moving manner; and the second cutting blade is fixed to the second base body.

11. The cutting device according to claim 3, wherein the first portion is provided with a weakened part.

12. The cutting device according to claim 11, wherein the weakened part comprises multiple through holes, with each through hole extending along a third direction, the third direction is perpendicular to the second direction and the first direction; and the multiple through holes are arranged along the second direction.

13. The cutting device according to claim 3, wherein the adjusting mechanism is mounted between the first portion and the second portion.

14. The cutting device according to claim 13, wherein the adjusting mechanism comprises a piezoelectric ceramic actuator.

15. A cutting method, comprising:
driving a pair of cutting blades of a cutting device to close to each other along a first direction to cut a material strip, the pair of cutting blades are mounted on a base of the cutting device, wherein the base comprises a first base body and a second base body, at least a portion of the first base body is capable of moving along the second direction relative to the second base body, the pair of cutting blades comprise a first cutting blade and a second cutting blade, the first cutting blade is provided on the first base body and the second cutting blade is provided on the second base body;
driving the pair of cutting blades to open in the first direction; and
driving at least a portion of the first base body to undergo elastic deformation relative to the second base body along the second direction before or during an opening process of the pair of cutting blades to form a clearance between the first cutting blade and the second cutting blade along the second direction,
wherein the second direction is a movement direction of a cutting material and intersects the first direction.

16. A cutting apparatus, comprising:
a conveying device, configured for conveying an electrode sheet; and
a cutting device configured for cutting the electrode sheet, wherein the cutting device comprises:
a base;
a pair of cutting blades, mounted on the base;
a drive mechanism, configured to drive the pair of cutting blades to close or open to each other in a first direction; and
an adjusting mechanism, configured to drive at least a portion of the base to undergo elastic deformation in a second direction before or during an opening process of the pair of cutting blades driven by the drive mechanism, so as to form a clearance between the pair of cutting blades in the second direction, wherein the second direction is a movement direction of a cutting material and intersects with the first direction,
wherein the base comprises a first base body and a second base body, and at least a portion of the first base body is capable of moving along the second direction relative to the second base body, the pair of cutting blades comprise a first cutting blade and a second cutting blade, the first cutting blade is provided on the first base body and the second cutting blade is provided on the second base body, the adjusting mechanism is configured to enable at least a portion of the first base body to undergo elastic deformation relative to the second base body along the second direction before or during the opening process of the pair of cutting blades driven by the drive mechanism, thereby forming the clearance between the first cutting blade and the second cutting blade along the second direction.

17. The cutting device according to claim 16, wherein the first base body comprises a first portion and a second portion; the first portion can undergo elastic deformation relative to the second base body along the second direction, and the second portion is connected to the second base body; and the first cutting blade is arranged on the first portion.

18. The cutting device according to claim 17, wherein the pair of cutting blades comprises the first cutting blade and the second cutting blade; the first cutting blade is connected to the first portion along the first direction in a moving manner; and the second cutting blade is fixed to the second base body.

19. The cutting device according to claim 17, wherein the first portion is provided with a guide hole, and the cutting device further comprises:
   a guide rod, extending in the first direction and slidably inserted through the guide hole,
   wherein the first cutting blade is fixed to the guide rod.

20. The cutting device according to claim 17, wherein at least one gap, which can undergo elastic deformation along the second direction, is provided between the first portion and the second portion; and the adjusting mechanism is configured to adjust the elastic deformation of the gap.

* * * * *